United States Patent [19]

Inoue et al.

[11] Patent Number: 4,608,948

[45] Date of Patent: Sep. 2, 1986

[54] AIR INTAKE DEVICE OF AN INTERNAL COMBUSTION ENGINE

[75] Inventors: Tokuta Inoue, Mishima; Kiyohiko Oishi, Susono; Takamitsu Okamoto, Susono; Keiso Takeda, Susono, all of Japan

[73] Assignee: Toyota Jidosha Kabushiki Kaisha, Toyota, Japan

[21] Appl. No.: 650,247

[22] Filed: Sep. 13, 1984

[30] Foreign Application Priority Data

Feb. 4, 1984 [JP] Japan .................................. 59-17661

[51] Int. Cl.⁴ ............................................ F02B 75/18
[52] U.S. Cl. .................. 123/52 M; 123/587; 123/52 MB; 137/625.4; 251/117
[58] Field of Search ......... 123/52 M, 52 MB, 52 MC, 123/308, 585, 587; 251/117; 137/625.4, 625.48, 872, 885, DIG. 8

[56] References Cited

U.S. PATENT DOCUMENTS

| | | | |
|---|---|---|---|
| 3,408,992 | 11/1968 | Seggern et al. .................. | 123/52 M |
| 3,738,109 | 6/1973 | Tatsutomi et al. .................. | 123/587 |
| 3,744,464 | 7/1973 | Soltau .................................. | 123/587 |
| 3,814,069 | 6/1974 | Croft et al. ..................... | 123/52 MF |
| 3,875,918 | 4/1975 | Loynd .............................. | 123/52 M |
| 4,026,253 | 5/1977 | Nishino et al. .................. | 123/52 M |
| 4,393,831 | 7/1983 | Bergmann et al. ................ | 123/587 |

FOREIGN PATENT DOCUMENTS

| | | | |
|---|---|---|---|
| 891339 | 8/1953 | Fed. Rep. of Germany ........ | 123/52 MB |
| 0099230 | 6/1982 | Japan .............................. | 123/52 M |

*Primary Examiner*—Craig R. Feinberg
*Assistant Examiner*—David A. Okonsky
*Attorney, Agent, or Firm*—Kenyon & Kenyon

[57] ABSTRACT

An air intake device comprising a main air intake passage and an auxiliary air intake passage. The main air intake passage interconnects the air cleaner to the engine cylinders. The auxiliary air intake passage is connected to the air cleaner at one end thereof and to the main air intake passage at the other end thereof. The equivalent pipe lengths of the main air intake passage and the auxiliary air intake passage are almost the same. A control valve actuated in response to the engine speed is arranged in the other end of the auxiliary air intake passage. The valve body of the control valve has a conically-shaped convex front face and a conically-shaped convex rear face.

16 Claims, 9 Drawing Figures

AIR INTAKE DEVICE OF AN INTERNAL COMBUSTION ENGINE

BACKGROUND OF THE INVENTION

1. Field of the Invention

The present invention relates to an air intake device of an internal combustion engine.

2. Background Information

In an internal combustion engine, when the intake valve closes, since the air stream flowing within the air intake passage is abruptly stopped by the intake valve, a positive pressure is generated in the intake port located behind the rear face of the intake valve. When such a positive pressure is generated in the intake port, the air located in the intake port flows toward the open end of the air intake passage. As a result, the pressure in the intake port is reduced and a vacuum is produced in the intake port. When a vacuum is produced in the intake port, the air flows toward the intake port and a positive pressure is generated again in the intake port. Consequently, when the engine is operating, a positive pressure and a vacuum are alternately produced in the intake port and a so-called air pulsation is generated. Where such an air pulsation is generated, if the time interval of the opening operation of the intake valve becomes equal to the time period of the air pulsation, a standing wave having a node at the open end of the air intake passage is generated in the air intake passage. When such a standing wave is generated when the intake valve opens, a positive pressure is generated in the intake port and volumetric efficiency is improved. If the time interval of the opening operation of the intake valve becomes equal to the time period of the air pulsation when the engine speed is low, a fundamental standing wave is generated and, if the time interval of the opening operation of the intake valve becomes equal to the time period of the air pulsation when the engine speed is high, a second harmonic standing wave is generated. Consequently, in an engine, a standing wave is generated at a particular engine speed and, at this time, volumetric efficiency is increased.

The engine speed at which such a standing wave is generated depends on the length of the air intake passage. Normally, the generation of the standing wave is discussed by regarding the air intake passage as a straight pipe having a function regarding the generation of the standing wave, which function is the same as that of the air intake passage, and the length of the straight pipe is normally called an equivalent pipe length. An ordinary engine has a fixed equivalent pipe length. Consequently, in such an ordinary engine, the volumetric efficiency is improved at a particular engine speed, but it is impossible to improve the volumetric efficiency over the entire region of the engine speed. However, in such an ordinary engine, if the equivalent pipe length is changed in accordance with a change in the engine speed, it is possible to increase the volumetric efficiency over the entire region of the engine speed, due to the air pulsation.

In order to increase the volumetric efficiency, there is proposed in copending U.S. application No. 06/629,336 filed July 10, 1984, now U.S. Pat. No. 4,565,166. an engine which comprises a main air intake passage connecting the air cleaner to the combustion chambers of the engine, and an auxiliary air intake passage having an equivalent pipe length which is the same as that of the main air intake passage. One of the ends of the auxiliary air intake passage is connected to the air cleaner, and the other end of the auxiliary air intake passage is connected to the main air intake passage. A control valve is arranged in the other end of the auxiliary air intake passage and opens when the engine speed is in a predetermined speed range. In this engine, the equivalent pipe length is changed by opening and closing the control valve and it is possible to increase the volumetric efficiency over the entire region of the engine speed. Where the volumetric efficiency is increased by using the air pulsation, as in the above-mentioned engine, to further increase the volumetric efficiency it is necessary to minimize the attenuation of the air pulsation as much as possible. To this end, it is necessary to minimize the flow resistance of the air intake passage as much as possible. However, in the above-mentioned engine, since the control valve is formed so that it has a large flow resistance, the air pulsation is attenuated by the control valve when the control valve opens. This results in a problem in that a satisfactory high volumetric efficiency cannot be obtained when the control valve opens.

SUMMARY OF THE INVENTION

An object of the present invention is to provide an air intake device of an internal combustion engine, which is capable of obtaining a high volumetric efficiency when the control valve opens by forming the control valve so that it has a shape which has less effect on the air pulsation.

According to the present invention, there is provided an air intake device of an internal combustion engine having an air cleaner and a cylinder, this device comprising: a main air intake passage interconnecting the air cleaner to the cylinder; an auxiliary air intake passage having a first end and a second end connected to the air cleaner and the main air intake passage, respectively, the auxiliary air intake passage having an equivalent pipe length substantially equal to that of the main air intake passage.

A valve means is arranged in the second end of the auxiliary air intake passage, the valve means having a valve port and a disc-shaped valve body which faces the valve port, and the valve body has a conically-shaped convex front face which is directed toward the main air intake passage, and a conically-shaped convex rear face which is formed opposite to the front face.

A means is provided for actuating the valve body in response to an engine speed, to open the valve port when the engine speed is in a predetermined first speed range, and to close the valve port by the valve body when the engine speed is in a predetermined second range.

The present invention may be more fully understood from the description of preferred embodiments of the invention set forth below, together with the accompanying drawings.

DESCRIPTION OF THE PREFERRED EMBODIMENTS

Figure 1:
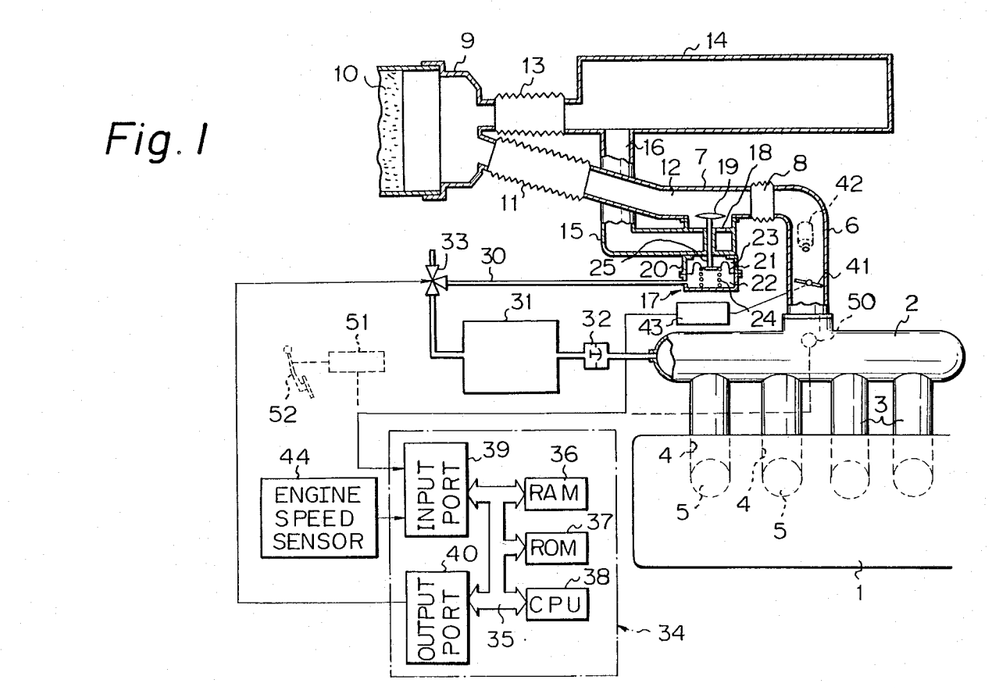
FIG. 1 is an overall view of an air intake device according to the present invention.

Referring to FIG. 1, reference numeral 1 designates an engine body, 2 an intake manifold, 3 branches of the intake manifold 2, and 4 intake ports formed in the engine body 1; 5 designates intake valves, 6 an air duct mounted on the intake manifold 2, 7 a main air intake pipe, and 8 a flexible hose interconnecting the main air intake pipe 7 and the air duct 6; 9 designates an air cleaner, 10 an element, and 11 a flexible hose interconnecting the air cleaner 9 and the main air intake pipe 7. The flexible hose 11, the main air intake pipe 7, the flexible hose 8, the air duct 6, the intake manifold 2, the manifold branches 3, and the intake ports 4, form a main air intake passage 12 interconnecting the air cleaner 9 to the engine cylinders. The air cleaner 9 is connected via a flexible hose 13 to a tank 14 having a fixed volume, and the tank 14 is connected to the main air intake pipe 7 via a connecting pipe 15. The flexible hose 13, the tank 14, and the connecting pipe 15, form an auxiliary air intake passage 16. A control valve 17 controlling the opening and closing operation of the auxiliary air intake passage 16 is arranged in the end of the connecting pipe 15. The control valve 17 comprises a valve port 18 formed in the auxiliary air intake passage 16, a valve body 19 controlling the opening and closing operation of the valve port 18, and an actuator 20 actuating the valve body 19. The actuator 20 comprises a vacuum chamber 22 and an atmospheric pressure chamber 23, which are separated by a diaphragm 21. A compression spring 24 for biasing the diaphragm is inserted in the vacuum chamber 22, and the diaphragm 21 is connected to the valve body 19 via a valve rod 25.

Figure 2:
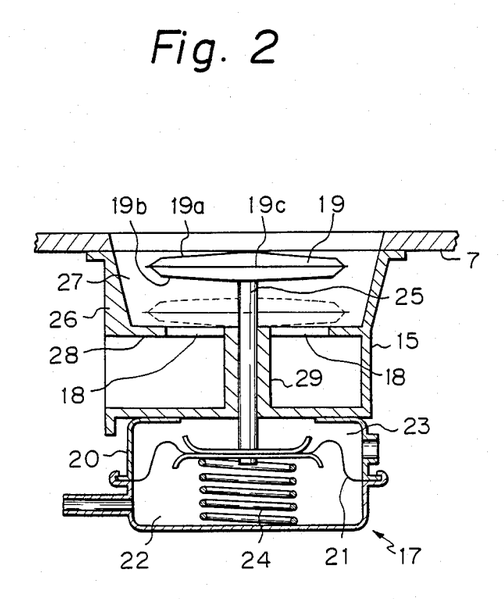
FIG. 2 is an enlarged cross-sectional side view of a portion of the air intake device shown in FIG. 1.

The construction of the control valve 17 will be hereinafter described in detail with reference to FIG. 2. Referring to FIG. 2, the connecting pipe 15 comprises a flange 26 having a conical shape, and the upper end portion of the flange 26 is fixed onto the main air intake pipe 7. A frustum-shaped valve chamber 27 is formed in the flange 26, and the valve port 18 having an annular shape is formed on the bottom wall 28 of the valve chamber 27. An upward projecting valve guide 29 is integrally formed on the bottom wall of the connecting pipe 15, and this valve guide 29 extends to the interior of the valve port 18. The valve rod 25 is slidably inserted into the valve guide 29. When a vacuum acts on the vacuum chamber 22 of the actuator 20, the diaphragm 21 moves downward against the compression spring 24. At this time, the valve body 19 moves downward until it abuts against the upper end face of the valve guide 29, as illustrated by the broken line in FIG. 2, and the valve body 19 closes the valve port 18. Contrary to this, when the atmospheric pressure acts on the vacuum chamber 22, the diaphragm 21 is moved upward due to the spring force of the compression spring 24, and the valve body 19 opens the valve port 18. At this time, the valve body 19 is located in the valve chamber 27 as illustrated by the solid line in FIG. 2, and does not project into the main air intake pipe 7. Consequently, at this time, the valve body 19 does not provide flow resistance to air flowing within the main air intake pipe 7. The valve body 19 has a disc shape, and the front face 19a and the rear face 19b of the valve body 19 are formed so that they have a conical face which is convexed outward. In addition, the front face 19a and the rear face 19b have a symmetrical conical shape with respect to the central cross section 19c of the valve body 19. Consequently, the valve body 19 does not provide a large flow resistance to air flowing around the valve body 19 upward and downward, and the flow resistances of the front face 19a and the rear face 19b to such air flow becomes the same.

Turning to FIG. 1, the vacuum chamber 22 of the actuator 20 is connected to a vacuum tank 31 via a conduit 30, and the vacuum tank 31 is connected to the intake manifold 2 via a check valve 32 which permits only the air flow from the vacuum tank 31 towards the intake manifold 2. A solenoid valve 33 which is able to be open to the atmosphere is inserted into the conduit 30, and the solenoid of the valve 33 is connected to an electronic control unit 34. The electronic control unit 34 is constructed by a digital computer and comprises a RAM (random access memory) 36, a ROM (read only memory) 37, a CPU (microprocessor) 38, an input port 39, and an output port 40, which are connected to each other by a bidirectional bus 35. The output port 40 is connected to the solenoid of the solenoid valve 33. A throttle valve 41 is inserted into the air duct 6, and a fuel injector 42 for injecting fuel toward the throttle valve 41 is arranged on the inner wall of the air duct 6 upstream of the throttle valve 41. A throttle switch 43 is attached to the throttle valve 41. This throttle switch 43 detects that the degree of opening of the throttle valve 41 exceeds a predetermined opening degree, for example, 50 degrees. The throttle switch 43 is connected to the input port 39. In addition, an engine speed sensor 44 producing a number of pulses proportional to the engine speed, is connected to the input port 39.

Figure 7:
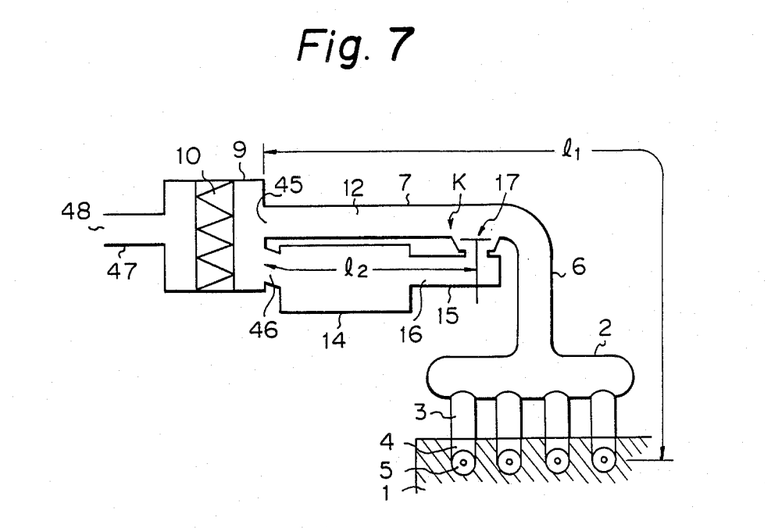
FIG. 7 is a schematic view of the air intake device shown in FIG. 1.

Next, the control of the air pulsation, which is effected by the air intake device according to the present invention, will be described with reference to FIG. 7. The main air intake passage 12 and the auxiliary air intake passage 16 have a complicated flow path. However, the main air intake passage 12 and the auxiliary air intake passage 16 are formed so that, when they are regarded as a straight pipe which is equivalent with respect to the occurrence of the air pulsation, the equivalent pipe length $l_1$ of the main air intake passage 12 becomes equal to the equivalent pipe length $l_2$ of the auxiliary air intake passage 16. In order to equalize the equivalent pipe lengths $l_1$ and $l_2$, it is necessary to form the main air intake passage 12 and the auxiliary air intake passage 16 so that, essentially, they have almost the same length. However, even if the auxiliary air intake passage 16 has a length which is shorter than that of the main air intake passage 12, it is possible to equalize the equivalent pipe lengths $l_1$ and $l_2$ by arranging the tank 14 in the auxiliary air intake passage 16.

When the control valve 17 closes, the construction of the air intake passage is such that the auxiliary air intake passage 16, which has a closed end and an equivalent pipe length the same as that of the main air intake passage 12, is connected to the air cleaner 9. When the air intake passage has such a construction, since the pressure produced by the air pulsation at the open end 45 of the main air intake passage 12, which is open to the air cleaner 9, and the pressure produced by the air pulsation at the open end 46 of the auxiliary air intake passage 16, which is open to the air cleaner 9, cancel each other out, the open end 45 of the main air intake passage 12 operative function is the same as that of the end of the straight pipe open to the atmosphere, which pipe is equivalent to the main air intake passage 12. That is, since the main air intake passage 12 is open to the atmosphere via the air nose 47 of the air cleaner 9, the open end 48 of the air nose 47 forms the end open to the atmosphere. However, by connecting the auxiliary air intake passage 16 having a closed end to the air cleaner 9, the open end 45 of the main air intake passage 12 forms the end open to the atmosphere. Consequently, the open end 45 of the main air intake passage 12 functions as the end open to the atmosphere independently of the constructions of the air cleaner 9 and the air nose 47. This means that it is possible to freely determine the constructions of the air cleaner 9 and the air nose 47.

When the control valve 17 closes, the open end 45 of the main air intake passage 12 functions as the end open to the atmosphere, as mentioned above. Consequently, at this time, the fundamental standing wave and the second harmonic standing wave, which are determined by the equivalent pipe length $l_1$, are generated at particular engine speeds.

Figures 5, 6:
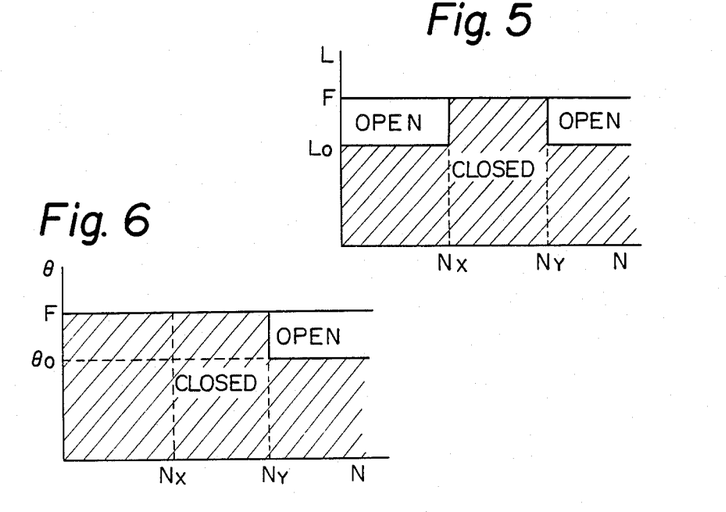
Figure 8:
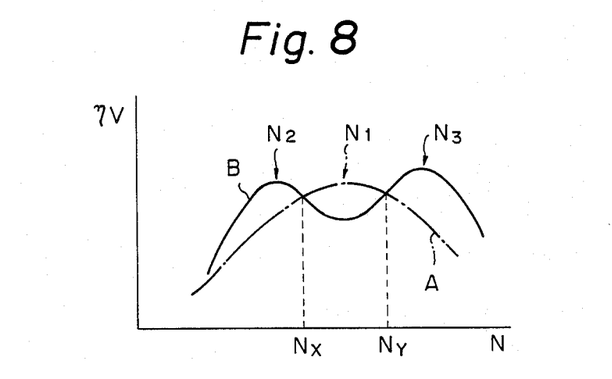
FIG. 8 is a diagram of the volumetric efficiency.

FIG. 8 illustrates the relationship between the volumetric efficiency $\eta v$ and the engine speed N. In FIG. 8, the curved line A indicates where the control valve 17 is closed, and the curved line B indicates where the control valve 17 is open. Where the control valve 17 is closed, and when the engine speed becomes equal to $N_1$, the second harmonic standing wave is generated. Consequently, when the engine speed is equal to $N_1$, the volumetric efficiency $\eta v$ is increased, as illustrated in FIG. 5.

When the control valve 17 is open, the position having an operative function the same as that of the end open to the atmosphere is changed. That is, when the control valve 17 is open, the pressure wave produced by the closing action of the intake valve 5 is propagated, on one hand, toward the air cleaner 9 through the main air intake passage 12 and, on the other hand, toward the air cleaner 9 through the auxiliary air intake passage 16 after passing through the control valve 17. At this time, since a phase difference occurs between the phase of the air pulsation at the open end 45 of the main air intake passage 12 and the phase of the air pulsation at the open end 46 of the auxiliary air intake passage 16, the open end 45 of the main air intake passage 12 no longer functions as the end open to the atmosphere. Thus, as can be clearly understood, the position functioning as the end open to the atmosphere is changed to a position near the position K illustrated in FIG. 7. As a result, the equivalent pipe length of the main air intake passage 12 becomes short and, as illustrated by the curved line B in FIG. 8, when the engine speed N becomes equal to $N_2$ and $N_3$, the volumetric efficiency $\eta v$ is increased. The increase in the volumetric efficiency $\eta v$ at the engine speed $N_2$ is caused by the occurrence of the fundamental standing wave, and the increase in the volumetric efficiency $\eta v$ at the engine speed $N_3$ is caused by the occurrence of the second harmonic standing wave. Consequently, from FIG. 5, it will be understood that, if the control valve 17 is caused to open when the engine speed N is lower than Nx and higher than Ny, and if the control valve 17 is caused to close when the engine speed N is between Nx and Ny, it is possible to obtain a high volumetric efficiency independently of the engine speed N.

Next, the operation of the air intake device according to the present invention will be described with reference to FIGS. 1 and 9.

Figure 9:
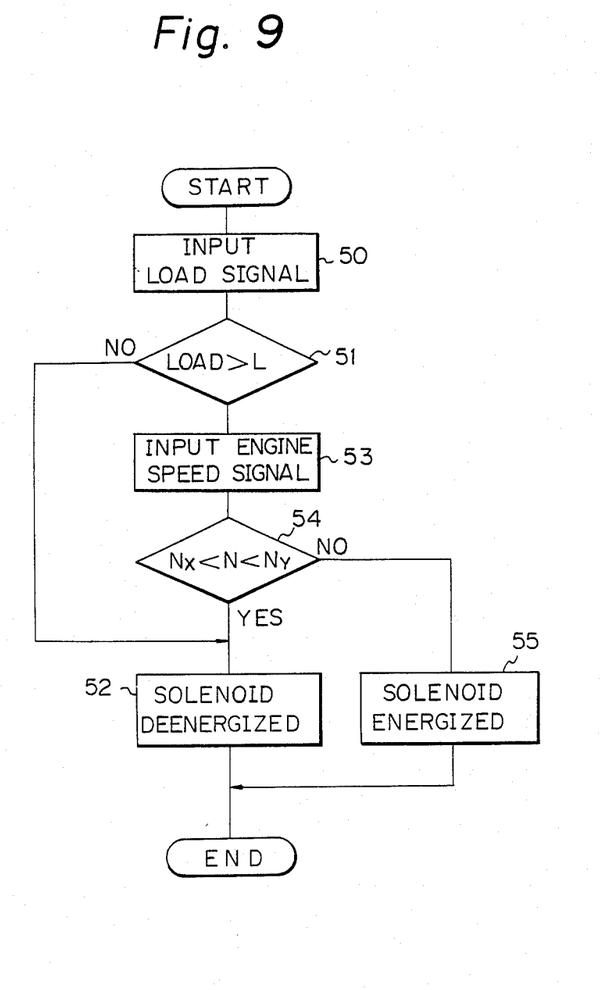
FIG. 9 is a flow chart of the control operation of the control valve.

In FIG. 9, initially in step 50, the output signal of the throttle switch 43 is input into the CPU 38. This throttle switch 43 produces an output signal indicating that the degree of opening of the throttle valve 41 exceeds 50 degrees, as mentioned above. The degree of opening of the throttle valve 41 corresponds approximately to the engine load, and the output signal of the throttle switch 43 indicates approximately that the engine load exceeds a predetermined load. In step 51, it is determined whether the degree of opening of the throttle valve 41 exceeds 50 degrees, that is, the engine load exceeds a predetermined load L. If the engine load is lower than the predetermined load L, the routine jumps to step 52, and the solenoid of the solenoid valve 33 is deenergized. When the solenoid of the solenoid valve 33 is deenergized, the vacuum chamber 22 of the actuator 20 is connected to the vacuum chamber 31 and, as a result, the valve body 19 closes the valve port 18. Contrary to this, when the engine load exceeds the predetermined load L, the routine goes to step 53. In step 53, the output signal of the engine speed sensor 44 is input into the CPU 38, and then, in step 54, it is determined whether the engine speed N is between Nx and Ny, as illustrated in FIG. 8. If the engine speed N is between Nx and Ny, the routine goes to step 52. In step 52, the solenoid of the solenoid valve 33 is deenergized and the valve body 19 closes the valve port 18. Consequently, at this time, a high volumetric efficiency $\eta v$ is obtained, as illustrated by the curved line A in FIG. 8. When the engine speed N is lower than Nx or higher than Ny, the routine goes to step 55, and the solenoid of the solenoid valve 33 is energized. At this time, the vacuum chamber 22 of the actuator 20 opens to the atmosphere and the valve body 19 opens the valve port 18. Consequently, at this time, the volumetric efficiency $\eta v$ is increased, as illustrated by the curved line B in FIG. 8.

Figures 3, 4:
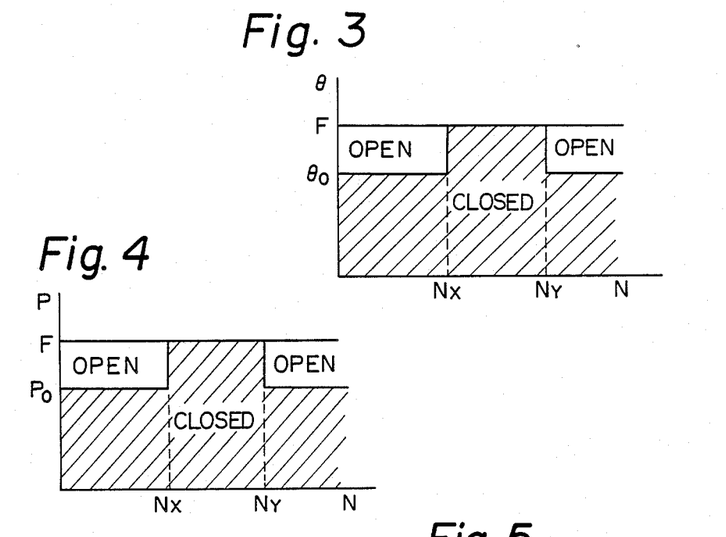
FIGS. 3-6 are diagrams indicating the open region and the closed region of the control valve corresponding to different embodiments of the invention.

FIG. 3 illustrates the open region and the closed region of the control valve 17. In FIG. 3, the ordinate $\theta$ indicates the degree of opening of the throttle valve 41, and the abscissa N indicates the engine speed. In addition, in the ordinate, F indicates a wide open throttle, and $\theta_0$ indicates 50 degrees. As illustrated in FIG. 3, the control valve 17 is caused to open when the degree of opening of the throttle valve 41 exceeds 50 degrees and when the engine speed N is lower than Nx or higher than Ny. In addition, when the degree of opening of the throttle valve 41 is smaller than 50 degrees, the control valve 17 is caused to close. However, at this time, instead of being closed, the control valve 17 may be caused to open. That is, when the degree of opening of the throttle valve 41 is small, since the air pulsation is suppressed by the throttle valve 41, an increase in the volumetric efficiency, which is caused by the air pulsation, is not expected. Consequently, when the degree of opening of the throttle valve 41 is smaller than 50 degrees the volumetric efficiency is the same, irrespective of whether the control valve 17 is open or closed.

Vacuum in the intake manifold 2 approximately indicates the engine load. Consequently, the control valve 17 may be controlled by the output signal of a vacuum switch 50 connected to the input port 39 and mounted on the intake manifold 2, as illustrated by the broken line in FIG. 1. FIG. 4 illustrates the situation where the control valve 17 is controlled by the output signal of the vacuum switch 50. In FIG. 4, the ordinate P indicates absolute pressure in the intake manifold 2, and the abscissa N indicates engine speed. In addition, F indicates atmospheric pressure, and $P_0$ indicates 660 mmHgabs. Here, the control valve 17 is caused to open when the absolute pressure P in the intake manifold 2 exceeds 660 mm Hgabs and when the engine speed N is lower than Nx or higher than Ny.

FIG. 5 illustrates where the present invention is applied to a diesel engine. Here, the throttle valve 41 and the fuel injector 42 illustrated in FIG. 1 are removed, and fuel injectors are arranged in the engine cylinders. In addition, as illustrated by the broken line in FIG. 1, a switch 51 actuated in response to the depressing operation of an accelerator pedal 52 is provided, and the control valve 17 is controlled by the output signal of the switch 51. In FIG. 5, the ordinate L indicates the depression of the accelerator pedal 52, and the abscissa N indicates engine speed. In addition, in the ordinate L, F indicates the maximum depression of the accelerator pedal 52, and $L_0$ indicates a predetermined depression thereof. Where the present invention is applied to a diesel engine, the control valve 17 is caused to open when the depression of the accelerator pedal 52 L exceeds the predetermined depression $L_0$ and when the engine speed N is lower than Nx or higher than Ny.

In the embodiment illustrated in FIG. 1, the vacuum tank 31 may be removed. Here, when the degree of opening of the throttle valve 41 is small, since the vacuum chamber 22 of the actuator 20 is connected to the intake manifold 2 via the check valve 32, the interior of the vacuum chamber 22 is maintained at a maximum vacuum produced in the intake manifold 2, and the valve body 19 closes the valve port 18. If the degree of opening of the throttle valve 41 exceeds 50 degrees, and the engine speed N becomes lower than Nx or higher than Ny, since the vacuum chamber 22 opens to the atmosphere, the control valve 19 opens the valve port 18. However, where the vacuum tank 31 is removed, as mentioned above, there is a danger that the valve body 19 will close the valve port 18 when the degree of opening of the throttle valve 41 exceeds 50 degrees and when the engine speed N is in a speed range between Nx and Ny. That is, if the throttle valve 41 is open to the maximum extent and, at this time, the engine speed N is lower than Nx, the vacuum chamber 22 opens to the atmosphere, as mentioned above, and the valve body 19 opens the valve port 18. If the engine speed N exceeds Nx when the throttle valve 41 remains open to the maximum extent, the solenoid of the solenoid valve 33 is deenergized and the vacuum chamber 22 is connected to the intake manifold 2 via the check valve 32. However, at this time, since the throttle valve 41 is opened to the maximum extent, vacuum in the intake manifold 2 is extremely small, and the valve body 19 continues to close the valve port 18. Consequently, where the vacuum tank 31 is removed, it is preferable that the control valve 17 be caused to open when the degree of opening of the throttle valve 41 exceeds 50 degrees and when the engine speed N becomes higher than Ny, as illustrated in FIG. 6.

According to the present invention, the control valve opens when the engine load exceeds a predetermined load and when the engine speed is within predetermined speed range. At this time, the pressure wave is alternately propagated around the control valve from the main air intake passage towards the auxiliary air intake passage and from the auxiliary air intake passage towards the main air intake passage. However, in the present invention, since the front face and the rear face of the valve body have a conical shape, the flow resistance of the valve body to the air stream is small, and it is possible to minimize the effect of the valve on the pressure wave. This results in obtaining a high volumetric efficiency by using the air pulsation.

While the invention has been described by reference to specific embodiments chosen for purposes of illustration, it should be apparent that numerous modifications could be made thereto by those skilled in the art without departing from the basic concept and scope of the invention.

We claim:

1. An air intake device for an internal combustion engine having an air cleaner and a cylinder, said device comprising:
 a main air intake passage interconnecting the air cleaner to the cylinder;
 an auxiliary air intake passage having a first end and a second end which are connected to the air cleaner and said main air intake passage, respectively, said auxiliary air intake passage having an equivalent pipe length which is substantially equal to that of said main air intake passage;
 valve means arranged in the second end of said auxiliary air intake passage and having a valve port and a disc-shaped valve body which faces said valve port, said valve body having a conically-shaped convex front face which is directed toward said main air intake passage and having a conically-shaped convex rear face which is formed opposite to said front face;
 means for actuating said valve body in response to an engine speed to open said valve port when the engine speed is within a predetermined first speed range and close said valve port by said valve body when the engine speed is within a predetermined second range, wherein said first speed range comprises a high speed range, and said second speed range comprises a range of the engine speed which is lower than the engine speed in said high speed range;
 a throttle valve arranged in said main air intake passage; and
 a single fuel injector arranged in said main air intake passage upstream of said throttle valve and downstream of the second end of said auxiliary air intake passage.

2. An air intake device according to claim 1, further comprising a tank which has a fixed volume and is arranged in said auxiliary air intake passage.

3. An air intake device according to claim 1, wherein the front face and the rear face of said valve body have a symmetrical shape with respect to a central cross section of said valve body.

4. An air intake device according to claim 1, wherein said actuating means comprises a diaphragm connected to said valve body, a vacuum chamber comprising said diaphragm, and a soleniod valve selectively connecting said vacuum chamber to a vacuum source or the atmosphere in response to the engine speed.

5. An air intake device according to claim 1, wherein said second speed range is an intermediate speed range, and said first speed range comprises a low range of the engine speed which is lower than the engine speed in said intermediate speed range in addition to the high range of the engine speed which is higher than the engine speed in said intermediate speed range.

6. An air intake device according to claim 1, wherein said valve means comprises a valve chamber open to said main air intake passage having a bottom wall which extends transversely in said auxiliary air intake passage, said valve port being formed on said bottom wall, said valve body being arranged in said valve chamber.

7. An air intake device according to claim 6, wherein said valve chamber has a conically-shaped circumferential inner wall which diverges toward said main air intake passage.

8. An air intake device according to claim 6, wherein said valve means comprises a valve guide extending to a central interior of said valve port, and a valve rod slidably inserted into said valve guide and connecting said valve body to said actuating means.

9. An air intake device according to claim 6, wherein the front face of said valve body does not project into said main air intake passage.

10. An air intake device of an internal combustion engine having an air cleaner and a cylinder, said device comprising:
a main air intake passage interconnecting the air cleaner to the cylinder;
an auxiliary air intake passage having a first end and a second end which are connected to the air cleaner and said main air intake passage, respectively, said auxiliary air intake passage having an equivalent pipe length which is substantially equal to that of said main air intake passage;
valve means arranged in the second end of said auxiliary air intake passage and having a valve port and a disc-shaped valve body which faces said valve port, said valve body having a conically-shaped convex front face which is directed toward said main air intake passage and having a conically-shaped convex rear face which is formed opposite to said front face; and
means for actuating said valve body in response to an engine speed to open said valve port when the engine speed is within a predetermined first speed range and close said valve port by said valve body when the engine speed is within a predetermined second range, wherein said first speed range comprises a high speed range, and said second speed range comprises a range of the engine speed which is lower than the engine speed in said high speed range, wherein said actuating means comprises
a diaphragm connnected to said valve body,
a vacuum chamber comprising said diaphragm,
a solenoid valve selectively connecting said vacuum chamber to a vacuum source or the atmosphere in response to the engine speed, and
an engine speed sensor, and said solenoid valve is actuated in response to an output signal of said engine speed sensor for connecting said vacuum chamber to the atmosphere when the engine speed is in said first speed range and for connecting said vacuum chamber to said vacuum source when the engine speed is in said second speed range.

11. An air intake device for an internal combustion engine having an air cleaner and a cylinder, said device comprising:
a main air intake passage interconnecting the air cleaner to the cylinder;
an auxiliary air intake passage having a first end and a second end which are connected to the air cleaner and said main air intake passage, respectively, said auxiliary air intake passage having an equivalent pipe length which is substantially equal to that of said main intake passage;
valve means arranged in the second end of said auxiliary air intake passage and having a valve port and a disc-shaped valve body which faces said valve port, said valve body having a conically-shaped convex front face which is directed toward said main air intake passage and having a conically-shaped convex rear face which is formed opposite to said front face; and
means for actuating said valve body in response to an engine speed to open said valve port when the engine speed is within a predetermined first speed range and close said valve port by said valve body when the engine speed is within a predetermined second range, wherein said first speed range comprises a high speed range, and said second speed range comprises a range of the engine speed which is lower than the engine speed in said high speed range, wherein said actuating means comprises
a diaphragm connected to said valve body,
a vacuum chamber comprising said diaphragm,
a solenoid valve selectively connecting said vacuum chamber to a vacuum source or the atmosphere in response to the engine speed; and
an engine speed sensor, and
an engine load sensor, said solenoid valve being actuated in response to output signals of said engine speed sensor and said engine load sensor for connecting said vacuum chamber to the atmosphere when the engine speed is in said first speed range and when the engine load exceeds a predetermined load and for connecting said vacuum chamber to said vacuum source when the engine speed is in said second speed range or when the engine load is lower then the predetermined load.

12. An air intake device according to claim 11, wherein said engine load sensor comprises a throttle switch which produces an output signal indicating that the degree of opening of a throttle valve arranged in said main air intake passage exceeds a predetermined degree.

13. An air intake device according to claim 11, wherein said engine load sensor comprises a vacuum switch arranged in said main air intake passage and producing an output signal which indicates that the absolute pressure in said main air intake passage exceeds a predetermined pressure.

14. An air intake device according to claim 11, wherein said engine load sensor comprises an accelerator switch which produces an output signal indicating that the depression of an accelerator pedal exceeds a predetermined depression.

15. An air intake device according to claim 10 or 11, wherein said vacuum source is said main air intake passage, and said actuating means comprises a conduit interconnecting said vacuum chamber and said main air intake passage, and a chekc valve arranged in said conduit and permiting only air flow from said vacuum chamber to said main air intake passage, said solenoid valve being arranged in said conduit located between said vacuum chamber and said check valve.

16. An air intake device according to claim 15, wherein said actuating means comprises a vacuum tank arranged in said conduit located between said check valve and said solenoid valve.

* * * * *

UNITED STATES PATENT AND TRADEMARK OFFICE
CERTIFICATE OF CORRECTION

PATENT NO. : 4,608,948

DATED : September 2, 1986

INVENTOR(S) : T. Inoue, et al.

It is certified that error appears in the above-identified patent and that said Letters Patent is hereby corrected as shown below:

Column 1, line 63, change "4,565,166. an" to --4,565,166, an--.

Column 8, line 59, change "soleniod" to --solenoid--.

Column 9, line 3, change "passage having" to --passage and having--.

Column 10, line 59, change "chekc" to --check--.

Column 10, line 60, change "permiting" to --permitting--.

Signed and Sealed this

Twenty-seventh Day of January, 1987

Attest:

DONALD J. QUIGG

Attesting Officer

Commissioner of Patents and Trademarks